Aug. 11, 1959

B. H. FORD 2,899,660

POTENTIOMETER

Filed Oct. 31, 1956

BIRCHARD H. FORD,
INVENTOR.

BY R. E. Geaugne

ATTORNEY

Aug. 11, 1959     B. H. FORD     2,899,660
POTENTIOMETER
Filed Oct. 31, 1956     2 Sheets-Sheet 2

BIRCHARD H. FORD,
INVENTOR.

BY R. E. Geangue

ATTORNEY

United States Patent Office 2,899,660
Patented Aug. 11, 1959

2,899,660

POTENTIOMETER

Birchard H. Ford, Pacific Palisades, Calif., assignor to Summers Gyroscope Company, Santa Monica, Calif., a corporation of California Application October 31, 1956, Serial No. 619,533

5 Claims. (Cl. 338—143)

This invention relates to variable resistance potentiometers and more particularly, to a variable resistance potentiometer having low inertia characteristics requiring less torque than conventional potentiometers.

In the electronic measuring field, as well as other fields, it is common practice to employ a potentiometer for converting mechanical deflections of a driving instrument to electrical signals by measuring voltages which can be employed for introduction to data recording devices, etc. Broadly stated, one type of potentiometer comprises a wiper slidably engageable with a helical resistance such as a multi-turn wire. The wiper is carried by a wiper arm rotatable in accordance with an input shaft coupled to the driving instrument which causes the wiper to travel circumferentially along the helical resistance. The travel of the wiper is directed in most instances by guiding means such as a screw and thread arrangement or by a track or ways provided adjacent the helical resistance. The inclusion of such guiding means involves a direct frictional engagement, other than associated with the wiper and helical resistance.

The difficulties encountered in the past by including guiding means in the construction of a potentiometer are due in part to the fact that the additional inherent friction generated by the guiding means requires torques which may be excessive for a driving instrument which may produce only very small torques. When relatively small mechanical displacements are transmitted by the driving instrument, accuracy and reliability of the electrical signals may be greatly impaired since the sliding action of the wiper is sometimes sluggish and erratic.

These difficulties have been overcome in accordance with the present invention in which the wiper arm is mounted by a mechanism in a fashion which incorporates a guiding function and which serves, in addition, to provide the normal wiping action. Also, the wiper arm mounting serves to advance the wiper along the helix of the multi-turn potentiometer whereas conventional potentiometers sometimes drive the wiper via the guiding means. Thus, the arm mounting mechanism provided to advance the wiper along the resistance helix is accomplished at no increase in the friction above that normally encountered by the wiper. The conventional guiding or driving mechanism which caused wiper arm motion along the helix has been converted by the present invention to a pivotal action whose effect on the torque required to turn the input shaft becomes less in comparison with that required to move the wiper itself. Furthermore, friction is reduced by mounting the input shaft on bearings so that all sliding associations other than the wiper per se have been obviated.

It is the object of the present invention to provide a novel potentiometer having low inertia characteristics and operable by a relatively low torque.

It is another object of the present invention to provide a novel potentiometer employing a pivotal action for advancing the wiper along the helical resistance as well as guiding the wiper.

Another object is to provide a novel wiper arm mounting means for a potentiometer which may be actuated by the application of low torques placed on the input shaft of the potentiometer.

Still another object is to provide a novel wiper arm mounting means whereby the wiper may be directed along the helix of the potentiometer resistance without the assistance of an independent guiding means such as a track, ways, threads, etc.

Further objects and features of the present invention are described and shown in following description and accompanying drawings, wherein.

Figure 1:
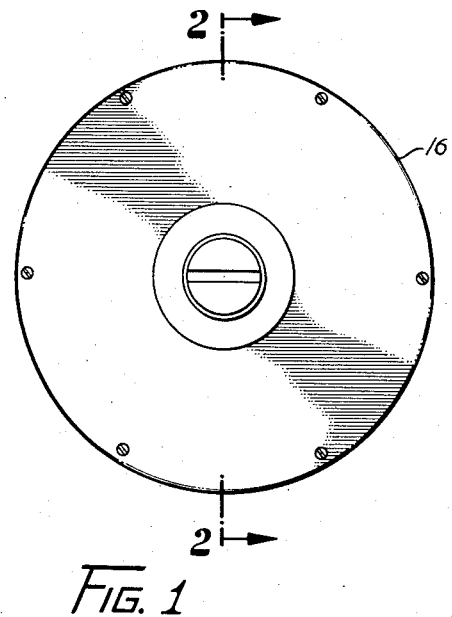
Figure 1 is a front elevational view showing the exterior of a potentiometer in accordance with the present invention.
Figure 2:
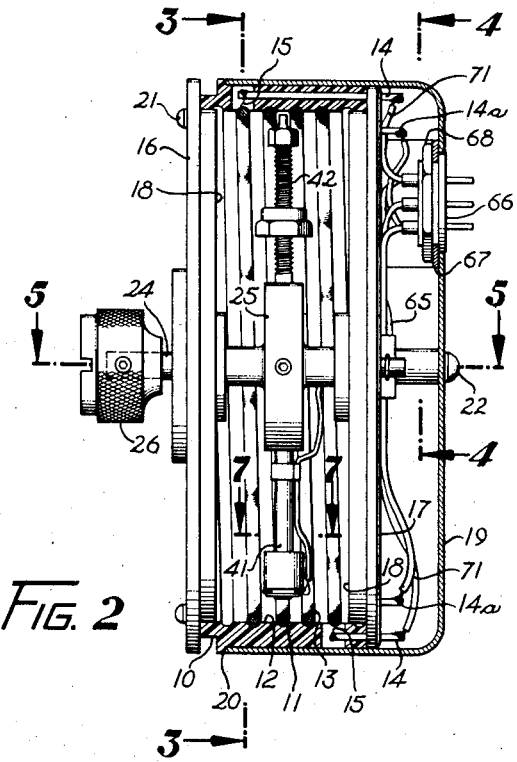
Figure 2 is a sectional view taken along line 2—2 of Figure 1 showing the potentiometer interior.
Figure 3:
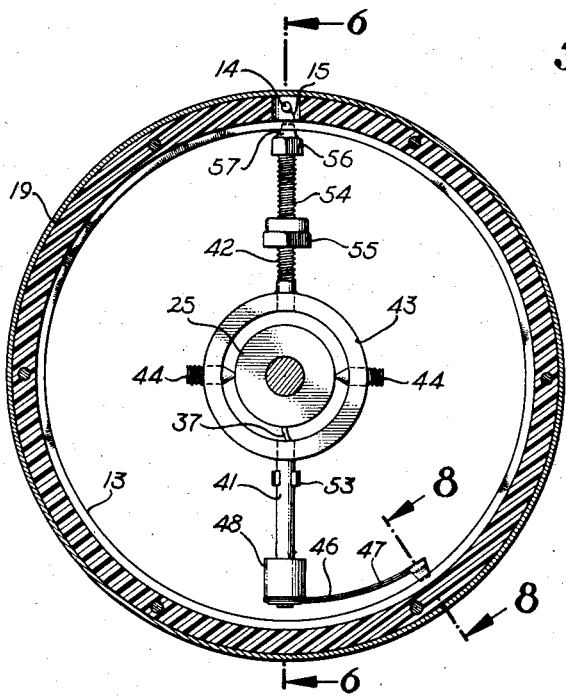
Figure 3 is a sectional view taken along line 3—3 of Figure 2 illustrating the mounting mechanism of the wiper arm.

Referring to Figures 1, 2 and 3, a potentiometer is shown in accordance with the present invention in which an annular base 10 is provided with a spiral groove 11 on its inside surface 12 adapted to receive a resistance element helix 13. The resistance element helix has a plurality of turns and is of a predetermined ohmic value dependent upon its length, cross-section and material, but as shown, a wire is employed. The base is formed from suitable insulation material such as rubber, ceramic, plastic, etc. so that each turn of the wire helix will be electrically isolated from adjacent turns except by their integral serial connection. Multiple electrical connections are spaced along the wire helix which comprises voltage signal terminals such as rods 14 connected to each end of the helix by a small diameter wire 15 such as by soldering.

The base is encased by a pair of circular discs 16 and 17, each having a flange 18 extendable interiorly of the annular base. A cover 19 butts against an annular shoulder 20 carried by the base and serves to protect all terminal connections from effects of surrounding environment. The discs are secured to the base by a plurality of equally spaced screws such as screws 21 whereas engagement between the base and cover 19 is achieved by an interference type fit and screws 22 threadably engaged with receptacles 23 carried by disc 17.

Extending along the central longitudinal axis of the potentiometer is a rotatable input shaft 24 cooperatingly supported by the pair of discs. The input shaft is constructed with an integral member 25 radially disposed about the central axis of the input shaft and centrally located within the hollow of the annular base equi-distant from disc flanges 18. As illustrated in the figures, a knob 26 is attached to one end of the input shaft so that the shaft may be manually rotated; however, it is to be understood that the shaft may be attached to a driving instrument (not shown) for remote automatic rotation.

Figure 5:
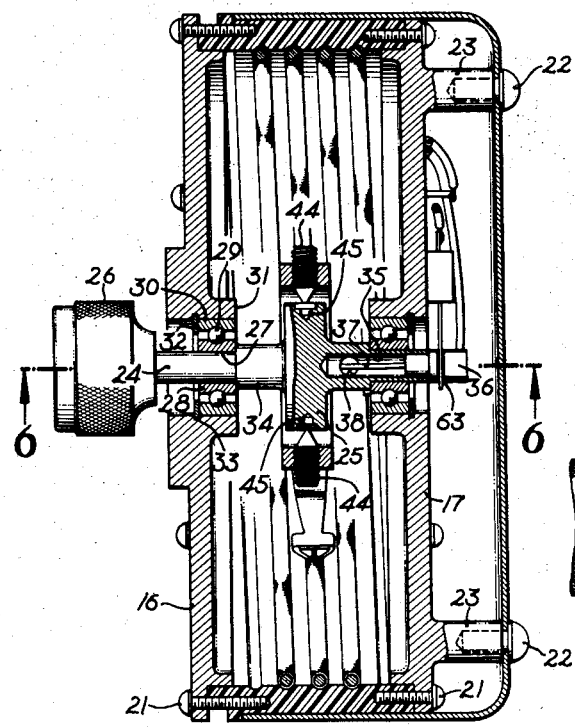
Figure 5 is a sectional view taken along line 5—5 of Figure 2 showing the input shaft mounted in bearings and showing the mounting mechanism of the wiper arm with respect to the input shaft.

As seen more clearly in Figure 5, each end of input shaft 24 is fitted through a center bore 27 of inner races 28 of a pair of ball bearings 29 whose outer races 30 are engageable with a central thickened portion 31 of each disc. The bearings are secured in place by means of a pair of snap rings 32 expanded into a pair of recesses 33 provided in each of the thickened portions 31 and by means of a shoulder 34 provided on each end of the input shaft adjacent the inner races respectively.

The end of the input shaft associated with disc 17 is provided with a bore 35 fitted with a cap 36 to which an electrical lead 37 is suitably connected. The lead lies within the bore and passes through an aperture 38 provided in the input shaft and extends to a wiper mechanism where suitable connection is made therewith.

The wiper mechanism comprises, in general, a pair of arms 41 and 42 disposed oppositely to each other about the periphery of a ring 43. Attachment between the pair of arms and the ring is achieved by suitable means such as welding or soldering for example. The wiper mechanism is pivotally carried by the input shaft by means of a mounting mechanism comprising a pair of pivots 44 extending through directly opposite sides of the ring engageable respectively with a pair of cups 45 carried on opposite sides of member 25. As shown in the figures, the pivots are threadably engageable with the ring and may be adjusted to adequately allow proper and full pivotal action of the ring along the longitudinal axis of the input shaft. Preferably, this arrangement of mounting the wiper mechanism maintains the ring in spaced relationship with respect to the input shaft and member 25 and permits the pair of arms 41 and 42 to pivot longitudinally with respect to the annular base while simultaneously being rotated by means of the input shaft.

Figure 7:
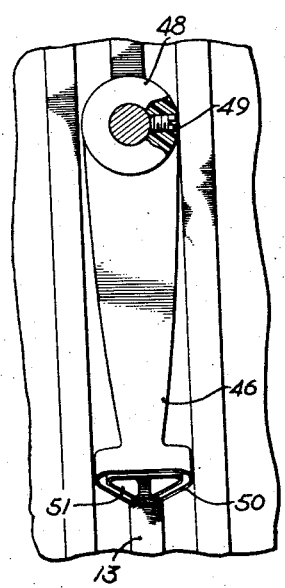
Figure 7 is an enlarged view of the wiper taken along line 7—7 of Figure 2 showing the wiper arm in cross section.
Figure 8:
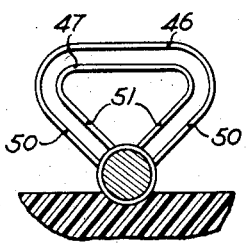
Figure 8 is an enlarged view of the wiper taken along line 8—8 of Figure 3 showing its engagement with the wire resistance.

Wiper arm 41 is provided with a spring biased wiper means comprising a pair of leaf springs 46 and 47 carried on one end of the arm by element 48, composed of insulation material such as plastic and rubber, for example, attached thereto by a set screw 49 as shown in Figure 7. Each leaf is provided with a flange portion 50 and 51 configured to substantially form a triangle as shown in Figure 8 in such a manner that the flange portions are slidably engaged with the exposed surface of the wire helix. Inasmuch as leaf spring 46 is placed on top of leaf spring 47, flange portion 50 is slightly longer than flange portion 51 so that at least four wiper contact points are provided at a particular area of the wire helix.

Electrical lead 37 is fastened to the leaf spring 46 adjacent element 48 so that a complete electrical path is provided from the wire helix to cap 36 via the wiper means. A holding clip 53 snapped around arm 41 is employed to restrict inadvertent floundering of lead 37 while the wiper mechanism is rotating and/or pivoting.

Arm 42 is provided with a plurality of threads 54 upon which a nut 55 rides. The nut may be manually rotated on arm 42 from its end attached to ring 43 to its opposite end carrying a stop nut 56. The position of nut 55 relative to ring 43 provides stability and balance for the wiper mechanism. Nut 56 is provided with a contoured tip 57 which travels in close proximity between adjacent wire turns of the wire helix. It is important to note that the tip does not ride on and is not engaged with the wire helix or annular base.

Figure 4:
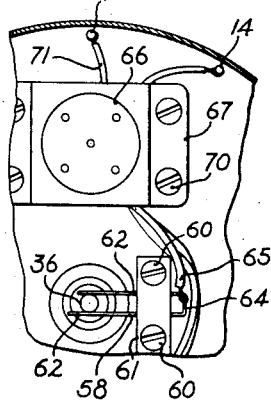
Figure 4 is a fragmentary sectional view taken along line 4—4 of Figure 2 illustrating the electrical contacts of the potentiometer and a suitable electrical connector terminal plug.

Referring to Figure 4, it can be seen that cap 36 is slidably engaged by a U shaped element 58 which is mounted on disc 17 by a pair of screws 60 passing through a mounting block 61. Legs 62 of the U shaped element slidably fit into an annular groove 63 extending about the cap so that although cap 36 rotates with the input shaft, the U shaped element remains stationary and in positive contact with the cap. Soldered to the central portion 64 of the U shaped element is a lead 65 which terminates at a conventional plug 66 mounted through the cover. The plug is secured to a mounting plate 67 by a locking nut and washer arrangement 68. The mounting plate, in turn, is secured to disc 17 by screws 70. Plug 66 serves as a convenient terminal means for a plurality of electrical leads such as leads 71 connected to one of the multiple electrical connections such as rods 14 connected to each end of the wire helix. Other electrical connections of the multiplicity such as rods 14a are provided at various predetermined locations along the wire helix offering a selectivity of ohmic values between rods for particular electrical circuits.

Figure 6:
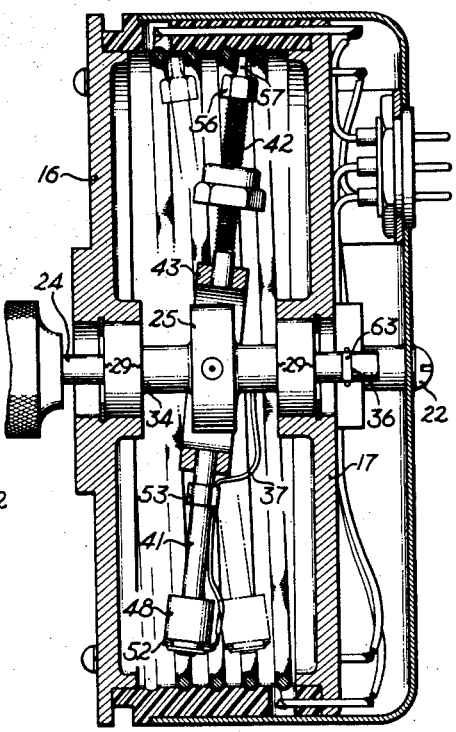
Figure 6 is a sectional view taken along line 6—6 of Figure 5 illustrating the wiper arm pivotal action as the wiper progresses along the helical resistance in accordance with input shaft rotation.

Actual operation will be described with reference to Figure 6 wherein a suitable voltage source (not shown) is properly connected to plug 66 and desired indicating or recording equipment (not shown) similarly is connected properly to plug 66. As the knob 26 is rotated either clockwise or counterclockwise, shaft 24 will rotate accordingly. A minimum of friction is encountered by shaft rotation inasmuch as it is mounted in bearings 29 carried by discs 16 and 17. The rotation of the input shaft about its central axis is substantially perpendicular to the pair of discs atttached to the annular base because of the engagement of shoulders 34 with inner race 28 of the ball bearings. Wiper arms 41 and 42 will follow the axial rotation of the input shaft since the wiper mechanism is attached to the input shaft member 25 by means of pivots 44. The axial movement of the wiper mechanism is followed by the wiper means as flange portions 50 and 51 of leaf springs 46 and 47 respectively slide along the exposed surface of the wire helix 13. During this wiper action the flange portions are always in contact with the wire helix and represent the only direct frictional contact. Biasing of the leaf springs is such that the flange portions of the leaf springs do not have a tendency to override the engaged portion of the wire helix.

As shaft rotation continues, the travel of the wiper means carried by arm 41 progresses from one turn of the wire helix to an adjacent turn by the pivotal action of ring 43. This pivotal action is along the input shaft axis since the pair of pivots 44 lie in the same plane as this axis. During rotation, stop nut 56 carried on arm 42 travels within the spiral space provided between adjacent turns which offers stability to the pivotal action. As shown in Figure 8, the ends of flange portions 50 and 51 slidably engage the exposed surface of one wire turn of the wire helix on substantially opposite sides of the wire. This arrangement insures proper tracking of the wiper means.

As shaft rotation continues, the wiper mechanism continues to pivot which causes a cocking of the wiper means about its connection points with the wire surface as the wiper moves away from the center of the potentiometer. The spring bias placed on the wiper means by the leaf springs maintains the wiper means in proper contact with the wire helix regardless of the cocking action.

Although a single wiper means is shown and described, it should be noted that additional wiper means may be carried by arm 41 having electrical leads attached thereto for particular electrical circuits, if desired.

It should be understood that while a specific potentiometer configuration has been shown, it is merely for illustrative purposes that certain alterations, modifications, and substitutions may be made in the instant disclosure without departing from the spirit and scope of the invention as defined by the appended claims.

I claim:

1. In a potentiometer, the combination comprising: a central shaft rotatable about its longitudinal axis; a resistance element having a plurality of helical turns concentric about said axis; a rigid wiper arm pivotally mounted on said central shaft for free pivotal rotation in a plane including said longitudinal axis and for forced rotation about said longitudinal axis in cooperation with said shaft upon rotation thereof; and wiper means mounted on said wiper arm and radially outwardly biased into frictional slidable engagement with said resistance element.

2. In a potentiometer, the combination comprising: a central shaft rotatable about its longitudinal axis; a resistance element having a plurality of helical turns concentric about said axis; a rigid wiper arm pivotally mounted on said central shaft for free pivotal rotation in a plane including said longitudinal axis and for forced rotation about said longitudinal axis in cooperation with said shaft upon rotation thereof; and wiper means mounted on said wiper arm and radially outwardly biased into frictional slidable engagement with said resistance element, said wiper means and said resistance element being cooperatively contoured whereby said resistance element constitutes a continuous guidance path for said pivotal rotation of said wiper arm during said forced rotation of said wiper arm.

3. In a potentiometer, the combination comprising: a central shaft rotatable about its longitudinal axis; a resistance element having a plurality of helical turns concentric about said axis and presenting an arcuate surface toward said axis; a rigid wiper arm pivotally mounted on said central shaft for free pivotal rotation in a plane including said longitudinal axis and for forced rotation about said longitudinal axis in cooperation with said shaft upon rotation thereof; and wiper means mounted on said wiper arm and having an effectively arcuate contact portion radially outwardly biased for frictional slidable engagement with said arcuate surface of said resistance element whereby said resistance element constitutes a continuous guidance path for said pivotal rotation of said wiper arm during said forced rotation of said wiper arm.

4. In a potentiometer, the combination comprising: a central shaft rotatable about its longitudinal axis; a resistance element having a plurality of helical turns concentric about said axis and presenting an arcuate surface toward said axis; a rigid wiper arm pivotally mounted on said central shaft for free pivotal rotation in a plane including said longitudinal axis and for forced rotation about said longitudinal axis in cooperation with said shaft upon rotation thereof; and wiper means mounted on said wiper arm, said wiper means comprising a leaf spring secured at one end thereof to said wiper arm and provided at the other end thereof with an effectively arcuate contact portion in frictional slidable engagement with said arcuate surface of said resistance element, said leaf spring being disposed for radially outward biasing of said contact portion against said resistance element whereby said resistance element constitutes a continuous guidance path for said pivotal rotation of said wiper arm during said forced rotation of said wiper arm.

5. In a potentiometer, the combination comprising: an annular base; a pair of discs disposed on the front and back of said annular base and provided with a pair of central bearings having a common longitudinal axis; a shaft disposed through said central bearings and rotatable about said axis; a resistance element secured to said annular base having a plurality of helical turns concentric about said axis and presenting an arcuate surface toward said axis; a rigid wiper arm pivotally mounted on said shaft at the geometrical center of said helical turns for free pivotal rotation in a plane including said longitudinal axis and for forced rotation about said longitudinal axis in cooperation with said shaft upon rotation thereof; and wiper means mounted on said wiper arm, said wiper means comprising a leaf spring secured at one end thereof to said wiper arm and provided at the other end thereof with an effectively arcuate contact portion in frictional slidable engagement with said arcuate surface of said resistance element, said leaf spring being disposed for radially outward biasing of said contact portion against said resistance element whereby said resistance element constitutes a continuous guidance path for said pivotal rotation of said wiper arm during said forced rotation of said wiper arm.

References Cited in the file of this patent

UNITED STATES PATENTS

| | | |
|---|---|---|
| 817,857 | Lea | Apr. 17, 1906 |
| 1,621,466 | Jenkins | Mar. 15, 1927 |
| 1,664,495 | Vadersen | Apr. 3, 1928 |
| 1,695,422 | Grisdale et al. | Dec. 18, 1928 |
| 1,861,052 | Dubilier | May 31, 1932 |
| 2,434,425 | Muller | Jan. 13, 1948 |
| 2,519,752 | Fox | Aug. 22, 1950 |